(12) United States Patent
Fujimura et al.

(10) Patent No.: US 8,350,002 B2
(45) Date of Patent: Jan. 8, 2013

(54) PROCESS FOR PRODUCING ETHYLENE/VINYL ALCOHOL COPOLYMER

(75) Inventors: Keisuke Fujimura, Osaka (JP); Nobuaki Sato, Osaka (JP); Satoshi Matsunuma, Osaka (JP); Yasufumi Beniya, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 13/496,610

(22) PCT Filed: Oct. 7, 2010

(86) PCT No.: PCT/JP2010/067623
§ 371 (c)(1),
(2), (4) Date: Mar. 16, 2012

(87) PCT Pub. No.: WO2011/043408
PCT Pub. Date: Apr. 14, 2011

(65) Prior Publication Data
US 2012/0172564 A1    Jul. 5, 2012

(30) Foreign Application Priority Data
Oct. 7, 2009  (JP) ................ 2009-233220

(51) Int. Cl.
C08F 6/00 (2006.01)
D06P 1/52 (2006.01)

(52) U.S. Cl. .......... 528/495; 525/55; 525/240; 525/244; 525/570; 528/271; 528/272; 528/322

(58) Field of Classification Search .............. 525/55, 525/240, 244, 570; 528/271, 272, 322, 495
See application file for complete search history.

(56) References Cited

U.S. PATENT DOCUMENTS

| | | | |
|---|---|---|---|
| 6,686,405 B1 | 2/2004 | Kawahara et al. | |
| 2002/0100997 A1 | 8/2002 | Kawahara et al. | |
| 2006/0108703 A1 | 5/2006 | Uchiumi et al. | |
| 2011/0166292 A1 | 7/2011 | Beniya et al. | |
| 2012/0022217 A1 | 1/2012 | Beniya et al. | |

FOREIGN PATENT DOCUMENTS

| | | |
|---|---|---|
| EP | 2 228 405 A1 | 9/2010 |
| JP | 2001-98077 A | 4/2001 |
| JP | 2002-80605 A | 3/2002 |
| JP | 2002-80606 A | 3/2002 |
| JP | 2002-284811 A | 10/2002 |
| JP | 2007-245432 A | 9/2007 |
| JP | 2007-320973 A | 12/2007 |
| JP | 2008-105204 A | 5/2008 |
| WO | 2004/009313 A1 | 1/2004 |
| WO | 2009/084509 A1 | 7/2009 |

OTHER PUBLICATIONS

International Search Report for PCT/JP2010/067623, mailed Nov. 30, 2010.
English translation of International Preliminary Report on Patentability for PCT/JP2010/067623, mailed May 18, 2012.

*Primary Examiner* — Terressa Boykin
(74) *Attorney, Agent, or Firm* — Greenblum & Bernstein, P.L.C.

(57) ABSTRACT

A process is provided for producing an ethylene/vinyl alcohol copolymer by which impurities such as catalyst residue and by-products and solvent are removed to a high degree. A high-quality, homogeneous product can be efficiently produced by including a washing step including: introducing a paste containing an ethylene/vinyl alcohol copolymer and an alcohol into a washing tank; applying a shear force to the paste to knead the paste while contacting the paste with washing water so that a surface of the paste is repeatedly displaced by an inner part thereof; and discharging the alcohol to an outside of the tank together with the washing water to obtain a water-containing ethylene/vinyl alcohol copolymer composition having a small alcohol content.

16 Claims, 2 Drawing Sheets

PROCESS FOR PRODUCING ETHYLENE/VINYL ALCOHOL COPOLYMER

TECHNICAL FIELD

The present invention relates to a process for producing an ethylene/vinyl alcohol copolymer, and more specifically, to a process for producing an ethylene/vinyl alcohol copolymer by which impurities such as a by-product to be produced in polymerization and saponification of ethylene and a vinyl ester to serve as raw materials for the ethylene/vinyl alcohol copolymer (hereinafter, sometimes referred to as "EVOH") in an alcohol, the residue of a catalyst to be used at the time of the saponification, and the alcohol solvent can be removed to a high degree.

BACKGROUND ART

An ethylene/vinyl alcohol copolymer (EVOH) is excellent in transparency, gas barrier property against oxygen or the like, solvent resistance, oil resistance, mechanical strength, and the like, and has been molded into a film, a sheet, a bottle, or the like to widely find use in various packaging materials such as a food packaging material, a drug packaging material, an industrial chemical packaging material, and an agricultural chemical packaging material.

The EVOH is typically produced by saponifying an ethylene/vinyl ester copolymer, which is obtained by the copolymerization of an aliphatic vinyl ester such as vinyl acetate and ethylene, in an alcohol solvent in the presence of a catalyst under high-temperature, high-pressure conditions. In recent years, the following process has been known as such production process (see Patent Literature 1). The alcohol solution of the EVOH in a high-temperature, high-pressure state obtained in the saponifying step is brought into contact with water or steam in a vessel so that the alcohol is replaced with the water. The viscosity of the resultant water/alcohol mixed solution of the EVOH stable at normal pressure is adjusted by regulating a ratio between the water and the alcohol or its pressure, and then the solution is melt-kneaded with an extruder. After that, the kneaded product is extruded into a strand shape in a low-temperature coagulating bath mainly formed of water or the like, and is then cut so as to be pelletized. After that, the pellet is washed and dried, and is then subjected to molding into a film, a sheet, a bottle, or the like.

However, the conventional production process for the EVOH has involved the following problem. When the EVOH is turned into a strand by extruding the water/alcohol solution of the EVOH in the coagulating bath, and then the alcohol is washed and removed, the alcohol washed out into the coagulating bath vaporizes in the air to be responsible for the deterioration of a working environment.

In view of the foregoing, the following process has been proposed as a process for solving the problem (see Patent Literatures 2 and 3). Before pelletization for obtaining the final product with an extruder is performed, the water/alcohol mixed solution of the EVOH stable at normal pressure (paste formed of a mixture of the EVOH, and the water and the alcohol) is pelletized once with a kneader or the like while its water content is reduced. After the water-containing EVOH composition pellet thus obtained has been washed and dried, the final product pellet of the EVOH is obtained with the extruder.

However, the production process disclosed in each of Patent Literatures 2 and 3 is disadvantageous in terms of a production cost because an apparatus for producing the water-containing EVOH composition pellet as an intermediate product (hereinafter, such pellet is sometimes referred to as "intermediate pellet") and an apparatus for drying the intermediate pellet are needed. In addition, the process involves the following drawbacks. It takes time and energy to dehydrate and dry the intermediate pellet. Moreover, the intermediate pellet of the EVOH remaining in the dryer for a long period of time is apt to deteriorate thermally, and there is a high risk that the deteriorated pellet is included in the subsequent product pellet or a subsequent molded article to serve as foreign matter.

Further, the water-containing EVOH composition as an intermediate product typically contains impurities such as the residue of the catalyst to be used at the time of the saponification, a by-product to be produced in saponification, and the alcohol as a solvent. When those impurities are included in large amounts, the EVOH pellet and a molded article using the pellet such as a film, a sheet, or a bottle to be obtained as the final products may suffer from a problem such as coloring. However, the production process for the EVOH (Patent Literatures 2 and 3) involving performing the washing after the production of the intermediate pellet has involved the following problem. As the washing is performed while the object of the washing is in a solid (pellet shape) state, it is difficult to completely remove the impurities from the inner part of the pellet.

In view of the foregoing, the inventors of the present invention have proposed the following processes for producing an ethylene/vinyl alcohol copolymer composition and a pellet thereof (see Patent Literature 4). In the production process for the EVOH composition, before pelletization for obtaining the final product with an extruder is performed, a paste (high-viscosity paste) formed of a mixture of an EVOH, and water and an alcohol is brought into contact with water while being stirred in a stirring vessel so that the composition of the paste is turned into an EVOH composition containing less than 10 parts by weight of the alcohol and 20 to 100 parts by weight of water with respect to 100 parts by weight of the EVOH. Thus, an EVOH composition having a low water content can be obtained without the performance of washing or heat drying after the pelletization.

Citation List

Patent Literature

[PTL 1] JP 2002-80605 A

[PTL 2] JP 2002-284811 A (corresponding to U.S. Pat. No. 6,838,029 A)

[PTL 3] WO 2004/009313 A1 (corresponding to US 2006108703 A1)

[PTL 4] WO 2009/084509 A1 (corresponding to EP 2228405 A1)

SUMMARY OF INVENTION

Although the process for producing an ethylene/vinyl alcohol copolymer pellet proposed by the inventors of the present invention (Patent Literature 4) shows an increase in the ratio at which the impurities are removed as compared with the conventional EVOH production process described in the foregoing, further investigations on the production process have revealed the following. The viscosity of the paste containing the EVOH and the alcohol as an object of washing in the production process is high. As a result, when only the stirring operation in the water is performed, the high-viscosity EVOH paste is stirred while maintaining its shape, and hence the inner part thereof is hardly exposed to the water. Accordingly, there is a possibility that the impurities cannot be sufficiently removed, and the alleviation of the possibility has been desired.

The present invention has been made in view of such circumstances, and an object of the present invention is to provide a process for producing an ethylene/vinyl alcohol copolymer by which impurities such as the residue of a saponification catalyst and a by-product to be produced in saponification, and a solvent are removed to a high degree, and a high-quality, homogeneous product can be efficiently produced.

In order to achieve the object, the gist of the present invention resides in a process for producing an ethylene/vinyl alcohol copolymer, including a main washing step including: introducing a paste containing an ethylene/vinyl alcohol copolymer and an alcohol into a horizontal washing tank; applying a shear force to the paste to knead the paste while bringing the paste into contact with washing water in the horizontal washing tank so that a surface of the paste is repeatedly displaced by an inner part thereof; and discharging at least some of the alcohol to an outside of the tank together with the washing water to obtain a water-containing ethylene/vinyl alcohol copolymer composition having a small alcohol content.

That is, the inventors of the present invention have further made extensive studies to solve the problems. As a result, the inventors have found that impurities in a high-viscosity paste containing an EVOH and an alcohol can be removed in a substantially complete manner by fully bringing the entirety of the paste into contact with washing water any number of times (that is, performing kneading in a liquid phase) as described below. Not only being merely stirred in water, the paste is also forcedly kneaded in a state of being brought into contact with the washing water while a shear force is applied so that such surface renewal that the surface of the paste is repeatedly displaced by the inner part thereof is performed. Thus, the inventors have reached the present invention.

It should be noted that in the present invention, the washing step as a point of the present invention is referred to as "main washing step." It is not meant in the present invention that the main washing relatively differs from any other washing step in the residence time of the paste or a difference between the amounts of the impurities before and after the washing.

The process for producing an ethylene/vinyl alcohol copolymer of the present invention has been made on the basis of such finding as described above. That is, a paste containing an ethylene/vinyl alcohol copolymer and an alcohol is introduced into a horizontal washing tank, and not only being merely stirred, the paste is also kneaded through the application of a shear force while being brought into contact with washing water introduced into the horizontal washing tank so that the surface of the paste is repeatedly displaced by the inner part thereof, in other words, surface renewal is performed. Accordingly, not only the surface of the paste but also the inner part thereof is brought into contact with the washing water. As a result, some or all of the alcohol, and impurities such as a remaining catalyst and a by-product in polymerization and saponification are removed together with the washing water with high efficiency. Therefore, according to the process for producing an ethylene/vinyl alcohol copolymer of the present invention, the amounts of the impurities in a water-containing EVOH composition to be obtained are reduced, and hence the quality of each of an EVOH and a molded article using the EVOH as the final products can be improved.

In addition, particularly when the horizontal washing tank is placed to tilt from above toward below along the flow direction of the paste in the horizontal washing tank, the paste loaded into the tank-type vessel moves from a paste introduction side to a paste derivation side (that is, from an upstream side to a downstream side) along the tilt by virtue of the self-weight of the paste itself while being kneaded, that is, subjected to surface renewal, and is then taken out to the outside of the tank-type vessel by means of gravity. Therefore, the process for producing an ethylene/vinyl alcohol copolymer of the present invention enables the paste to smoothly pass the main washing step even when its viscosity is high.

In addition, when the horizontal washing tank has a bath ratio of 0.5 to 10 in terms of a weight ratio of the introduced washing water to the introduced paste, a balance between the replacement and washing efficiency of the water and the alcohol in the horizontal washing tank, and a cost-to-performance ratio is optimized.

In addition, when the horizontal washing tank includes a screw for applying the shear force in a direction perpendicular to the lengthwise direction of the horizontal washing tank and the screw has a clearance of 1 to 20 mm, the efficiency of the surface renewal of the paste is additionally improved.

Meanwhile, an additive such as a carboxylic acid compound, a boron compound, or a phosphoric acid compound may be added to the ethylene/vinyl alcohol copolymer for improving the physical properties of the EVOH such as heat resistance, and in the conventional production process for the EVOH, the following method has been adopted. After the EVOH has been turned into an intermediate pellet, the pellet is immersed in an aqueous solution containing the additive, and is then dehydrated and dried. However, a technology for uniformly dispersing the additive in the pellet to an additionally high degree has been requested in association with a growing request for resin performance as a result of recent sophistication of a molding technology.

In contrast, in the production process of the present invention, when the washing water of the main washing step contains at least one kind of additive selected from a carboxylic acid, a carboxylate, a boron compound, and a phosphoric acid compound, the additive can be uniformly dispersed even to the inner part of the paste in association with the kneading, i.e., surface renewal of the paste. In addition, the process has the following advantage. There is no need to provide a step or facility for adding the additive, and hence a reduction in the number of steps involved in the production and the simplification of facilities involved therein can be realized.

Further, in the present invention, the case where the water-containing ethylene/vinyl alcohol copolymer composition obtained in the main washing step has a water content of 30 to 400 parts by weight with respect to 100 parts by weight of the ethylene/vinyl alcohol copolymer is advantageous because there is no need to use a special extruder having, for example, a large L/D value (effective length of a screw/diameter of the screw) when the water-containing EVOH composition is melt-kneaded and pelletized with an extruder.

It should be noted that when the water content of the paste-like water-containing ethylene/vinyl alcohol copolymer composition obtained in the main washing step is excessively low, the following tendency is observed. The viscosity of the water-containing ethylene/vinyl alcohol copolymer composition increases, and hence the transfer efficiency of the resin reduces. In contrast, when the water content is excessively high, there is a tendency that production efficiency reduces upon dehydration and drying of the resin.

Next, when the process for producing an ethylene/vinyl alcohol copolymer of the present invention includes a preliminary washing step including: introducing the solution containing the ethylene/vinyl alcohol copolymer and the alcohol into a washing vessel; bringing the solution into contact with water or steam in the washing vessel; and discharging some of the alcohol to the outside of the vessel together with the water or the steam to obtain a paste containing the ethylene/vinyl alcohol copolymer, the alcohol, and the water before the performance of the main washing step, the replacement of the alcohol (solvent) and the water in the solution can be performed in an additionally efficient manner.

In addition, when the process for producing an ethylene/vinyl alcohol copolymer of the present invention includes the step of obtaining a pellet of the ethylene/vinyl alcohol copolymer including: supplying the water-containing ethylene/vinyl alcohol copolymer composition obtained in the main washing step to an extruder; melt-kneading the composition, ejecting the composition after the kneading; and cutting the composition, the replacement of the alcohol (solvent) and the water in the solution containing the EVOH and the alcohol is efficiently performed before the pelletizing step. Accordingly, there is no need to perform the washing of the pellet and heat drying in association therewith after the pelletization with the extruder. Therefore, the process for producing an ethylene/vinyl alcohol copolymer of the present invention can not only realize a reduction in the number of steps involved in the production of the EVOH pellet and the simplification of facilities involved therein but also reduce a cost for the production of the EVOH as a result of the speed-up of the steps and energy savings.

It should be noted that the pellet of the ethylene/vinyl alcohol copolymer obtained from the step of obtaining the pellet desirably has a water content of less than 10 parts by weight with respect to 100 parts by weight of the EVOH.

DESCRIPTION OF EMBODIMENTS

Next, an embodiment of the present invention is described in detail with reference to drawings, provided that the present invention is not limited to the embodiment.

Figure 1:
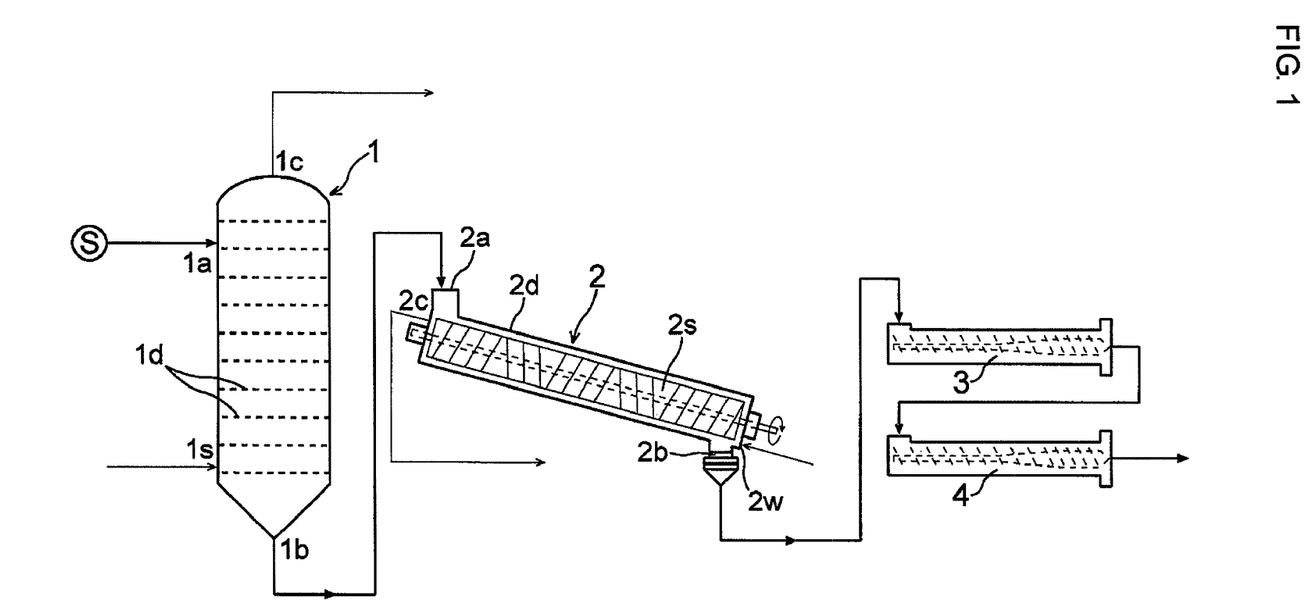
FIG. 1 is a flow diagram illustrating the outline of one embodiment of a process for producing an ethylene/vinyl alcohol copolymer of the present invention.

FIG. 1 is a flow diagram illustrating the outline of one embodiment of a process for producing an ethylene/vinyl alcohol copolymer of the present invention.

The process for producing an EVOH includes: a saponification treatment step (not shown) of saponifying an alcohol solution of an ethylene/vinyl ester (ethylene/vinyl acetate in this example) copolymer to obtain an alcohol solution of the EVOH; a preliminary washing step of bringing the solution containing the EVOH and the alcohol into contact with steam in a tower-type washing vessel to obtain a paste containing the EVOH and the alcohol; a main washing step including: bringing the paste into contact with washing water in a horizontal washing tank while applying a shear force; and repeatedly displacing the inner part and surface of the paste, that is, performing kneading in a liquid phase to obtain a paste-like water-containing EVOH composition (EVOH paste) having a small alcohol content; and a pelletizing step (not shown) of pelletizing the water-containing EVOH composition after the washing with an extruder, a strand cutter, and the like.

The "paste containing the EVOH and the alcohol" (sometimes referred to as "EVOH paste") in the present invention is a rubber-like (or jelly-like) water-containing gel, and is a soft, fluid, deformable solid. The EVOH paste can be easily cut into solids with a knife or the like. Thus, a new surface is formed, and the cut solids can coalesce with another solid to form a new solid (the foregoing can be repeated again). In the present invention, washing and/or a thermal stabilizer addition treatment are/is performed while "surface renewal" in which solids are repeatedly cut and caused to coalesce in a liquid phase is performed by means of the nature of the rubber-like EVOH paste that is soft and fluid.

The viscosity of the rubber-like EVOH paste is a value for the viscosity of 500 g of the paste measured by a falling-ball viscosity measurement method (Stokes' law) with a steel ball having a diameter of 3 mm in a glass autoclave, and is typically $10^1$ to $10^6$ mPa·s, preferably $10^2$ to $10^6$ mPa·s, particularly preferably $10^2$ to $10^4$ mPa·s. Such viscosity of the EVOH paste depends on a temperature, a pressure, the concentration of an EVOH resin content, and an alcohol content. Therefore, means of such a structure that the cutting and coalescence of the EVOH paste can be repeatedly performed needs to be adopted as kneading means to be used in the main washing step of the present invention, and hence means of, for example, a screw type, a gear type, or a paddle type to be described later is typically used.

It should be noted that when the EVOH paste is opaque, a method of calculating the viscosity with a stirring torque value in correlation with the falling-ball viscosity measured value is employed. That is, the falling-ball viscosities of 500 g of a plurality of transparent pastes having different viscosities are measured, and then their stirring torque values at a constant stirring speed in a glass autoclave having six paddle blades under the same condition are recorded. The stirring torque value of an opaque paste is separately measured under the same condition with reference to such data, and then the falling-ball viscosity measured value is calculated from such data.

It should be noted that in the present invention, the step of bringing the solution containing the EVOH and the alcohol obtained in the saponification treatment step into contact with steam in the tower-type washing vessel to obtain the paste containing the EVOH and the alcohol is referred to as "preliminary washing step" as described in the foregoing. In the present invention, the preliminary washing step means a step prior to the main washing step, and it is not meant that the preliminary washing step relatively differs from any other washing step in the residence time of the paste or a difference between the amounts of the impurities before and after the washing.

First, the ethylene/vinyl ester copolymer to be used in the present invention and the EVOH to be obtained in the present invention are described in advance.

The EVOH to be obtained in the present invention is a water-insoluble, thermoplastic resin. The EVOH is typically obtained by saponifying the ethylene/vinyl ester copolymer obtained by copolymerizing a vinyl ester and ethylene, is mainly formed of an ethylene structural unit and a vinyl alcohol structural unit, and contains a slight amount of a vinyl ester structural unit remaining at the time of the saponification.

A representative example of the vinyl ester compound is vinyl acetate, and there may also be used vinyl formate, vinyl acetate, vinyl propionate, vinyl valerate, vinylbutyrate, vinyl isobutyrate, vinyl pivalate, vinyl caprate, vinyl laurate, vinyl stearate, vinyl benzoate, vinyl versatate, and the like alone or in combination of two or more thereof.

It should be noted that in the present invention, a copolymerizable ethylenically unsaturated monomer as well as ethylene and the vinyl ester may be copolymerized to such an extent that characteristics requested of the EVOH are not impaired. Examples of the monomer include the following monomers. For example, there are given olefins such as propylene, 1-butene, and isobutene, hydroxy group-containing α-olefins such as 2-propen-1-ol, 3-buten-1-ol, 4-penten-1-ol, 5-hexen-1-ol, 3,4-dihydroxy-1-butene, and 5-hexene-1,2-diol, and acylated products and esterified products thereof. Examples of the esterified products include 3,4-diacyloxy-1-butenes, in particular, 3,4-diacetoxy-1-butene. There are also given unsaturated acids such as acrylic acid, methacrylic acid, crotonic acid, phthalic acid (anhydride), maleic acid (anhydride), and itaconic acid (anhydride), or salts thereof and mono- or dialkyl esters thereof whose alkyl groups each have 1 to 18 carbon atoms. There are also given acrylamides such as acrylamide, an N-alkylacrylamide whose alkyl group has 1 to 18 carbon atoms, N,N-dimethylacrylamide, 2-acrylamidopropanesulfonic acid or a salt thereof, and acrylamidopropyldimethylamine or an acid salt thereof and a quaternary salt thereof, and methacrylamides such as methacrylamide, an N-alkylmethacrylamide whose alkyl group has 1 to 18 carbon atoms, N,N-dimethylmethacrylamide, 2-methacrylamidopropanesulfonic acid or a salt thereof, and methacrylamidopropyldimethylamine or an acid salt thereof and a quaternary salt thereof. There are also given N-vinylamides such as N-vinylpyrrolidone, N-vinylformamide, and N-vinylacetamide, vinyl cyanides such as acrylonitrile and methacrylonitrile, vinyl ethers such as an alkyl vinyl ether, a hydroxyalkyl vinyl ether, and an alkoxyalkyl vinyl ether whose alkyl groups each have 1 to 18 carbon atoms, vinyl halides such as vinyl chloride, vinylidene chloride, vinyl fluoride, vinylidene fluoride, and vinyl bromide, vinylsilanes such as trimethoxyvinylsilane, allyl acetate, allyl chloride, trimethyl-(3-acrylamide-3-dimethylpropyl)-ammonium chloride, acrylamide-2-methylpropanesulfonic acid, vinyl ethylene carbonate, and glycerin monoallyl ether.

In addition, the ethylene content of the EVOH is determined at the time of the polymerization of ethylene and the vinyl ester, and does not change before and after the saponification. The ethylene content is a value for the ethylene content in the EVOH measured on the basis of ISO 14663, and is typically 20 to 60 mol %, preferably 20 to 55 mol %, more preferably 25 to 50 mol %. When the ethylene content is excessively small, moldability in melt molding tends to reduce. In contrast, when the content is excessively large, gas barrier property when the EVOH is used in a molded product tends to reduce.

The average saponification degree of the vinyl ester component in the EVOH is a value measured on the basis of JIS K 6726 (provided that the measurement is performed in such a solution state that the EVOH is uniformly dissolved in a water/methanol solvent), and is typically 90 to 100 mol %, preferably 95 to 100 mol %, more preferably 99 to 100 mol %. When the saponification degree is excessively low, the gas barrier property, moisture resistance, or the like tends to reduce.

In addition, a melt flow rate (MFR) (at 210° C. and under a load of 2,160 g) in the EVOH is typically 0.1 to 100 g/10 minutes, preferably 0.5 to 50 g/10 minutes, more preferably 1 to 30 g/10 minutes. When the melt flow rate is excessively small, the following tendency is observed. A high-torque state is established at the time of the melt molding, thereby making it difficult to perform molding. In addition, when the melt flow rate is excessively large, the external appearance property or gas barrier property of a molded product using the EVOH tends to reduce.

A known polymerization method such as solution polymerization, suspension polymerization, emulsion polymerization, or bulk polymerization is employed for the copolymerization of ethylene and the vinyl ester. Of those, solution polymerization is preferably employed. It should be noted that a solvent to be used in solution polymerization needs to be able to dissolve ethylene and the vinyl ester, and the ethylene/vinyl ester copolymer as a product of their polymerization, and an alcohol is typically used. An alcohol having 1 to 4 carbon atoms is preferred, and specific examples thereof include methanol, ethanol, n-propyl alcohol, isopropyl alcohol, and t-butyl alcohol. In addition, when a solvent to be used in a saponification treatment to be described later and the solvent at the time of the polymerization are made the same in consideration of the saponification treatment, there is no need for solvent replacement, and at the same time, treatments such as recovery and reuse can also be efficiently performed. Accordingly, methanol (MeOH) is particularly preferably used as the polymerization solvent.

The saponification of the ethylene/vinyl ester copolymer obtained by solution polymerization or the like is performed with a saponification catalyst in a state in which the copolymer is dissolved in a solvent containing an alcohol such as an alcohol or a water/alcohol mixed solvent. In addition, the concentration of an ethylene/vinyl ester copolymer resin content in the alcohol-containing solution of the ethylene vinyl/ester copolymer is typically 20 to 70 wt %, suitably 30 to 60 wt %. When the solvent, which is preferably an alcohol solvent, is a water/alcohol mixed solvent, its mixing ratio is typically (1/99) to (30/70), preferably (1/99) to (20/80), more preferably (1/99) to (10/90) in terms of a weight ratio (water/alcohol).

In addition, examples of the saponification catalyst include an alkali catalyst and an acid catalyst. Specific examples of the alkali catalyst include: alkali metal hydroxides such as sodium hydroxide and potassium hydroxide; and alkali metal alkoxides such as sodium methylate, sodium ethylate, potassium methylate, and lithium methylate. Specific examples of the acid catalyst include: inorganic acids such as sulfuric acid, hydrochloric acid, and nitric acid; organic acids such as methanesulfonic acid; zeolite; and a cation exchange resin. Of those, an alkali catalyst is preferred from the viewpoints of handleability and industrial productivity, and an alkali metal hydroxide is particularly preferred. The usage of the catalyst is appropriately selected depending on, for example, a target saponification degree. For example, when an alkali catalyst is used, its usage is typically 0.001 to 100 millimole equivalents, preferably 3 to 30 millimole equivalents with respect to the amount of an aliphatic vinyl ester.

Any one of batch-type, continuous (belt-type), and tower-type methods can be adopted as a method for the saponification depending on the target saponification degree. A tower-type apparatus (not shown) is preferably used because of, for example, the following reasons. The amount of the catalyst at the time of the saponification can be reduced and a saponification reaction easily progresses with high efficiency.

In addition, the saponification reaction is typically performed in the alcohol solvent under heat and a pressure while the system is kept in a solution state. The pressure has only to be regulated depending on the ethylene content of the ethylene/vinyl ester copolymer. Specifically, for example, the pressure is selected from the range of typically 0 to 1 MPaG, preferably 0.1 to 0.5 MPaG, and the temperature is typically 50 to 180° C., preferably 80 to 160° C. In addition, a saponification reaction time is typically 0.1 to 6 hours. It should be noted that the unit "MPaG" is a unit in a gauge value, and represents a difference between an absolute pressure and an atmospheric pressure (the same holds true for the following "MPaG").

In addition, the EVOH after the saponification reaction is derived as a solution using, for example, an alcohol solution or water/alcohol solution in a high-temperature, high-pressure state as a solvent from the reaction system, and is then directly supplied to the washing vessel of the preliminary washing step or is stored in a tank or the like once as required before the supply. The EVOH is specifically, for example, S in FIG. 1.

It should be noted that in the saponification reaction, the vinyl ester moiety of the ethylene/vinyl ester copolymer is converted into a hydroxyl group and a leaving group is turned into a carboxylic acid ester as a by-product. For example, when vinyl acetate is used as the vinyl ester, methyl acetate (MeAc) is produced as a by-product at the time of the saponification.

In addition to the foregoing, when the saponification catalyst is an alkali catalyst, the metal which the catalyst has is turned into a metal carboxylate as a by-product. For example, when vinyl acetate is used as the vinyl ester and sodium hydroxide is used as the catalyst, sodium acetate is produced as a by-product. In addition, the reduction of a carboxylic acid or the oxidation of an alcohol results in the production of the corresponding aldehyde as a by-product. For example, acetaldehyde is produced as a by-product at the time of the saponification of an ethylene/vinyl acetate copolymer.

Next, the step of replacing some of the alcohol in the solution containing the EVOH and the alcohol obtained in the saponification treatment step with water to obtain a water-containing EVOH composition having a small alcohol content is described.

The process for producing an ethylene/vinyl alcohol copolymer in the present invention involves replacing the alcohol in the solution of the EVOH containing the alcohol with water and removing a by-product to be produced in saponification, the residue of the catalyst to be used at the time of the saponification, and the like through dissolution in water. In addition, the foregoing is preferably performed in a plurality of stages. When the foregoing is performed in a plurality of stages, the process more specifically includes the main washing step after the preliminary washing step. In this case, any other washing step may be performed a plurality of times between the preliminary washing step and the main washing step in some cases.

<Description of Preliminary Washing Step>

First, the washing vessel in the preliminary washing step includes a tower-type vessel such as: a plate column such as a perforated-plate tower or a bubble tower; or a packed tower. In the plate column type, its number of theoretical plates is typically 2 to 20, preferably 5 to 15. In addition, in the packed tower type as well, the amount of a filler is set in conformity with the number. The solution containing the EVOH and the alcohol, and steam and/or water are introduced into such tower-type vessel, and both the solution and the steam and/or the water are brought into contact with each other so that some of the alcohol in the solution of the EVOH is replaced with the water. Then, a paste containing the EVOH, the alcohol, and the water, and a mixture of the water and the alcohol are derived from the tower-type vessel.

The positions at which the solution containing the EVOH and the alcohol, and the steam and/or the water are introduced into the tower-type vessel, and the positions at which the paste of the EVOH containing the alcohol and the water, and the water/alcohol mixture are derived are arbitrary. Although the contact between the alcohol solution of the EVOH and the water or the steam can be performed by any one of a counter flow and a parallel flow, the solution and the water or the steam are preferably brought into contact with each other by the counter flow from the viewpoint of replacement efficiency. Specifically, the following mode is preferably adopted. The solution containing the EVOH and the alcohol is introduced from the upper portion of the tower, steam is introduced from the lower portion of the tower and brought into contact with the solution by a counter flow, alcohol steam is derived from the upper portion of the tower together with the steam, and the paste of the EVOH containing the alcohol and the water is derived from the lower portion of the tower.

It should be noted that the position at which the solution containing the EVOH and the alcohol is supplied when the plate column is used is below the apex portion of the tower by typically 2 to 8 plates, preferably 2 to 4 plates. A water layer is preferably formed on any tray plate above the supply position by supplying water or adjusting the amount of steam to be derived because of the following reason. The entrainment of the spray of the EVOH or the like in the mixed steam of the water and the alcohol derived from the upper portion of the tower is prevented, and hence contamination in a steam transfer tube or in a condenser can be prevented.

In addition, the position at which steam is supplied, which is typically the bottom portion of the tower from the viewpoint of replacement efficiency, may be above the bottom portion by 1 to 5 plates in some cases. It should be noted that the mixed steam of the alcohol and the water derived from the tower can be reused by being liquefied with a condenser or the like, and being separated and purified.

Specifically, for example, as illustrated in FIG. 1, a tower-type washing vessel 1 having a plurality of tray plates 1$d$ is used. The solution containing the EVOH and the alcohol obtained in the saponification treatment step is introduced into the washing vessel 1 from a paste introduction port 1$a$ at the upper portion of the tower, and is then brought into contact with the steam introduced into the washing vessel 1 from a steam introduction port 1$s$ at the lower portion of the tower so that some of the alcohol in the solution is replaced. Then, a paste containing the EVOH, the alcohol, and the water is derived from a paste derivation port 1$b$ at the bottom portion of the tower, and at the same time, some of the replaced alcohol is discharged to the outside of the vessel from an exhaust port 1$c$ at the apex portion of the tower together with the steam.

It should be noted that at this time, not only the water (and/or the steam) and the replaced alcohol but also a by-product at the time of the saponification is partially discharged from the exhaust port 1$c$ together with the water, and hence the amount of an impurity that causes a problem such as coloring in the EVOH and a molded article thereof can be reduced.

The contents of the alcohol and water in the paste containing the EVOH, the alcohol, and the water derived from the tower-type vessel can be controlled by the introduction amount of the water (and/or the steam) with respect to the solution containing the EVOH and the alcohol to be introduced into the vessel, a temperature and a pressure in the tower, and the like. For example, the following conditions are preferably used for a method of controlling the amount of water, though the preferred conditions cannot be uniquely determined because the preferred conditions vary depending on the specifications of the tower-type vessel to be used such as the number of tray plates, a ratio between a sectional area and a tower length, and the pore diameters and number of perforated plates.

The concentration of the EVOH resin content of the solution containing the EVOH and the alcohol to be introduced into the preliminary washing step is typically 10 to 70 wt %, preferably 20 to 65 wt %, more preferably 30 to 60 wt %. In addition, when the solvent is a mixture of water and an alcohol, its mixing ratio is typically (1/99) to (80/20), suitably (1/99) to (70/30), more suitably (1/99) to (60/40) in terms of a weight ratio (water/alcohol). The alcohol is incorporated in an amount of typically 80 to 500 parts by weight, preferably 100 to 300 parts by weight with respect to 100 parts by weight of the EVOH.

When the introduction amount of the steam (or the water) to be introduced into the tower-type vessel is excessively small, the efficiency of replacement with the alcohol becomes insufficient. In contrast, when the amount is excessively large, a disadvantage in terms of a cost arises. The amount of the steam is typically 0.01 to 30 times (weight ratio), suitably 0.1 to 10 times, more suitably 0.5 to 5 times as large as the introduction amount of the solution of the EVOH.

The temperature of each of the water and the steam to be introduced is typically 30 to 200° C., preferably 80 to 180° C., more preferably 100 to 150° C. The steam is particularly preferably introduced into the vessel from the viewpoint of replacement efficiency. The water and the steam may be such that a product obtained by purifying the mixed steam of the alcohol and the water derived from the vessel is reused, or may be mixed steam containing a slight amount of the alcohol. It should be noted that in the case of the mixed steam containing a slight amount of the alcohol, the content of the alcohol is typically 10 parts by weight or less with respect to 100 parts by weight of the steam, and from the viewpoint of the replacement efficiency of the water and the alcohol, the content of the alcohol is preferably smaller, ideally zero.

The temperature in the tower-type vessel is typically 80 to 200° C., suitably 100 to 180° C., more suitably 110 to 150° C. When the temperature is excessively low, the viscosity of the solution of the EVOH in the vessel increases, and hence the replacement efficiency reduces in some cases. In contrast, when the temperature is excessively high, the resin itself tends to deteriorate.

The pressure in the tower-type vessel is typically 0 to 1 MPaG, preferably 0 to 0.5 MPaG, more preferably 0.1 to 0.3 MPaG. When the pressure is excessively low, the replacement efficiency tends to reduce. In addition, when the pressure is excessively high, the following tendency is observed. The temperature in the vessel increases, and hence the EVOH is apt to deteriorate thermally.

The paste containing the EVOH, the alcohol, and the water to be derived from the tower-type vessel through the preliminary washing step typically contains 10 to 200 parts by weight of the alcohol with respect to 100 parts by weight of the EVOH. The amount of the alcohol is preferably 20 to 150 parts by weight, more preferably 30 to 120 parts by weight on the basis of the entire paste. In addition, the paste has an EVOH resin content of typically 20 to 60 wt %, preferably 30 to 50 wt %, and contains the water in an amount of typically 20 to 200 parts by weight, suitably 30 to 150 parts by weight, more suitably 40 to 100 parts by weight with respect to 100 parts by weight of the EVOH. The viscosity of such paste is a value for the viscosity of 500 g of the paste measured by a falling-ball viscosity measurement method (Stokes' law) with a steel ball having a diameter of 3 mm in a glass autoclave, and is typically $10^1$ to $10^5$ mPa·s, preferably $10^1$ to $10^4$ mPa·s, particularly preferably $10^1$ to $10^3$ mPa·s. As the alcohol content becomes relatively small, the viscosity of the paste tends to increase.

It should be noted that a water/alcohol ratio in this case is typically (1/99) to (80/20), preferably (10/90) to (75/25), more preferably (30/70) to (70/30) in terms of a weight ratio (water/alcohol). When the content of one of the alcohol and the water is excessively large, a burden on the main washing step to be subsequently performed tends to be large. In addition, when the content of one of the alcohol and the water is excessively small, the following tendency is observed. The viscosity increases, and hence the replacement efficiency in the latter half of the tower-type vessel reduces or derivation from the tower-type vessel becomes difficult.

Further, the remaining saponification catalyst which the paste has is turned into an acetate of its cation when the saponification catalyst is an alkali catalyst, or is turned into acetic acid when the saponification catalyst is an acid catalyst. The content of the remaining saponification catalyst is typically 1,000 to 4,000 ppm, suitably 1,500 to 3,000 ppm, more suitably 1,700 to 2,700 ppm with respect to the EVOH. It should be noted that in the case of an alkali catalyst, the content is determined through measurement by ion chromatography after the extraction of the alkali (metal) with a 1-wt % acetic acid solution.

It should be noted that a known water/methanol adjustment step, the step of adding a known additive to be described later, the step of introducing water (and/or steam) to the EVOH, or the like may be provided between the preliminary washing step and the main washing step to be described later as required. For example, a thermal stabilizer is preferably incorporated into the paste obtained in the preliminary washing step before the paste is subjected to the main washing step, and acetic acid and boric acid are particularly preferably incorporated. The content of acetic acid is typically 1,500 to 4,000 ppm with respect to the EVOH, and boric acid can be typically added at a content of 100 to 1,000 ppm with respect to the EVOH.

<Description of Main Washing Step>

Next, the main washing step as a characteristic step of the present invention is described.

The EVOH paste to be subjected to the main washing step (hereinafter, the EVOH paste to be subjected to the main washing step is sometimes referred to as "EVOH paste (I)" for convenience) is a paste containing the ethylene/vinyl alcohol copolymer and the alcohol. The content of the alcohol which such EVOH paste (I) has is typically 3 to 200 parts by weight, preferably 5 to 150 parts by weight, more preferably 10 to 120 parts by weight with respect to 100 parts by weight of the EVOH. In addition, its EVOH resin content is typically 10 to 60 wt %, preferably 10 to 50 wt %.

When the paste contains water, the content of the water is typically 20 to 1,000 parts by weight, suitably 40 to 500 parts by weight, more suitably 40 to 300 parts by weight with respect to 100 parts by weight of the EVOH. It should be noted that a water/alcohol ratio in this case is typically (1/99) to (70/30), preferably (10/90) to (70/30), more preferably (30/70) to (70/30) in terms of a weight ratio (water/alcohol).

The viscosity of such EVOH paste is a value for the viscosity of 500 g of the paste measured by a falling-ball viscosity measurement method (Stokes' law) with a steel ball having a diameter of 3 mm in a glass autoclave, and is typically $10^1$ to $10^6$ mPa·s, preferably $10^2$ to $10^6$ mPa·s, particularly preferably $10^2$ to $10^4$ mPa·s.

It should be noted that when the EVOH paste (I) is a paste free of water, and containing the EVOH and the alcohol, the paste is preferably brought into the paste state described above before being subjected to the main washing step by regulating its viscosity with a temperature or a pressure.

Here, the EVOH paste (I) to be subjected to the main washing step is still in a state of containing the remaining saponification catalyst, and the content of the remaining saponification catalyst is typically 1,000 to 4,000 ppm, suitably 1,500 to 3,000 ppm, more suitably 1,700 to 2,700 ppm with respect to the EVOH. It should be noted that in the case of an alkali catalyst, the content is determined through measurement by ion chromatography after the extraction of the alkali (metal) with a 1-wt % acetic acid solution.

Typically used in the main washing step is a horizontal washing tank having a paste introduction port, a paste derivation port, a washing water introduction port, and a water discharge port at arbitrary positions. The shape of the horizontal washing tank is specifically, for example, a rectangular parallelopiped shape or a columnar shape. The paste is transferred in the lengthwise direction of the horizontal washing tank.

In addition, the main washing step is as described below. The EVOH paste (I) (preferably the EVOH paste (I) obtained by incorporating water in advance to reduce the alcohol content in the preliminary washing step) is introduced into the horizontal washing tank from the paste introduction port provided for the tank.

The paste is brought into contact with washing water introduced into the horizontal washing tank from the washing water introduction port separately provided for the tank, and then some or all of the remaining alcohol in the paste is discharged to the outside of the horizontal washing tank from the separately provided water discharge port together with the washing water. Then, a paste-like water-containing EVOH composition with an additionally small alcohol content is separately obtained from the paste derivation port (hereinafter, the paste obtained by the main washing step is sometimes referred to as "EVOH paste (II)" for convenience).

In addition, the main characteristic of the present invention lies in the following. In the main washing step, an apparatus for kneading a paste is built in the horizontal washing tank, the introduced paste containing the EVOH and the alcohol (EVOH paste (I)) is kneaded in the washing water while being subjected to such surface renewal that its surface is repeatedly displaced by its inner part, and hence the paste-like EVOH resin can be uniformly brought into contact with the washing water even at the inner part of the paste. That is, the main characteristic lies in that kneading in a liquid phase is performed.

Although the contact between the introduced paste and the washing water can be performed by any one of a counter flow and a parallel flow, the paste and the washing water are preferably brought into contact with each other by the counter flow from the viewpoint of replacement efficiency. The supply of the EVOH paste (I) to the washing tank, which can be performed continuously or intermittently, is preferably continuous supply from the viewpoint of production efficiency.

In addition, the dealcoholization amount of such paste in the horizontal washing tank per 100 parts by weight of the EVOH is typically 80 to 100 wt %, preferably 90 to 100 wt %, particularly preferably 96 to 100 wt % of the amount of the alcohol which the paste before the introduction into the horizontal washing tank contains.

Specifically, for example, as illustrated in FIG. 1, the EVOH paste (I) is introduced into a horizontal washing tank 2 from a paste introduction (loading) port 2a at the upper portion of the tank, and is then brought into contact with the washing water introduced into the horizontal washing tank 2 from a washing water introduction port 2w at the lower portion of the tank so that some or all of the remaining alcohol in the EVOH paste (I) is replaced with the water. Then, the alcohol is discharged to the outside of the vessel from a water discharge port 2c at the upper portion of the tank together with the washing water. Meanwhile, the paste-like water-containing EVOH composition (EVOH paste (II)) with a small alcohol content is obtained from a paste derivation port 2b at the bottom portion of the tank.

The bath ratio of the horizontal washing tank can be represented as a weight ratio of the introduced washing water to the introduced paste, and is typically 0.5 to 10, preferably 0.6 to 5, more preferably 0.8 to 3. The bath ratio affects the replacement efficiency of the alcohol. When the bath ratio is excessively high, economical efficiency tends to reduce, and when the bath ratio is excessively low, replacement and washing efficiency tends to reduce.

Further, the residence time of the paste in the horizontal washing tank, which varies depending on the target characteristics of the EVOH, is typically 0.5 to 10 hours, suitably 1 to 8 hours, more suitably 1 to 5 hours.

The introduction amount of the EVOH paste (I) into the washing tank, which varies depending on the bath ratio, is typically 10 to 90 vol %/hour, preferably 10 to 50 vol %/hour, more preferably 10 to 25 vol %/hour with respect to the internal volume of the horizontal washing tank. When the introduction amount is excessively small, the efficiency of replacement with the alcohol tends to reduce. In contrast, when the introduction amount is excessively large, the following tendency is observed. The speed at which the paste is derived from the washing tank cannot keep up with the amount, thereby resulting in poor economical efficiency.

It should be noted that the temperature of the EVOH paste (I) to be introduced is typically 40 to 110° C., preferably 50 to 100° C.

In addition, the residence time of the washing water is typically 0.5 to 20 hours, preferably 0.5 to 15 hours.

In addition, a temperature in the washing tank is preferably kept constant. The temperature in the washing tank is typically 50 to 150° C., preferably 60 to 120° C., more preferably 70 to 110° C. When the temperature is excessively high, the viscosity of the paste reduces, and when the temperature is excessively low, the viscosity may increase to such an extent that the paste becomes hard to deal with. In particular, the temperature is preferably regulated with the washing water. This intends to maintain the fluidity of the introduced paste. Therefore, the temperature of the washing water is typically 70 to 160° C., suitably 80 to 130° C. in consideration of natural heat dissipation.

Further, the main washing step in the present invention, which can be performed under a normal pressure condition, can be performed while a pressure is changed as required. The pressure is typically 0 to 1 MPaG, preferably 0 to 0.6 MPaG, more preferably 0 to 0.3 MPaG. When the pressure is excessively high, the following tendency is observed. The temperature in the vessel increases, and hence the EVOH is apt to deteriorate thermally.

In addition, at least one kind of thermal stabilizer selected from a carboxylic acid, a carboxylate, a boron compound, and a phosphoric acid compound is preferably added to the washing water to be introduced into the horizontal washing tank. In association with the kneading of the paste in the washing water, the thermal stabilizer can be uniformly dispersed in the paste simultaneously with the washing.

The carboxylic acid is preferably a carboxylic acid having 2 to 4 carbon atoms, and a monovalent or divalent acid is suitably used. Specific examples of such acid include oxalic acid, succinic acid, benzoic acid, citric acid, acetic acid, propionic acid, and lactic acid. Of those, acetic acid is preferably used in terms of, for example, a cost and ease of availability.

When the carboxylic acid is added, the content of the carboxylic acid in the EVOH paste (II) to be obtained after the main washing step is a value measured by a titration method, and is typically 10 to 10,000 ppm, preferably 50 to 3,000 ppm, more preferably 100 to 2,000 ppm with respect to the EVOH. When the content of the carboxylic acid is excessively small, there is a tendency that an effect of incorporating the carboxylic acid is not sufficiently obtained. In contrast, when the content is excessively large, it tends to become difficult to obtain a uniform film. It should be noted that the concentration of the carboxylic acid in the washing water is typically 10 to 3,000 ppm, suitably 20 to 1,000 ppm, more suitably 30 to 500 ppm.

In addition, a carboxylate may be added on purpose from the viewpoint of the equilibrium effect of the thermal stabilizer, and the carboxylate is typically a carboxylate having 2 to 4 carbon atoms. In addition, amonovalent or divalent carboxylate is suitably used. Specific examples of such carboxylate include salts such as alkali metal salts (e.g., sodium and potassium), and alkaline earth metal salts (e.g., calcium and magnesium), of oxalic acid, succinic acid, benzoic acid, citric acid, acetic acid, propionic acid, lactic acid, and the like. Of those, an acetate is preferred in terms of, for example, a cost and ease of availability, and sodium acetate is particularly preferably used.

When the carboxylate is added, the content of the carboxylate in the EVOH paste (II) to be obtained after the main washing step is typically 10 to 5,000 ppm, suitably 30 to 1,000 ppm, more suitably 50 to 700 ppm with respect to the EVOH paste in terms of a metal in atomic absorption spectrometry. When the content is excessively small, coloring may occur at the time of melt molding, and when the content is excessively large, a melt viscosity may increase. It should be noted that the concentration of the carboxylate in the washing water is typically 10 to 3,000 ppm, preferably 20 to 1,000 ppm, more preferably 30 to 500 ppm.

Examples of the boron compound include boric acids such as boric acid, a boric acid ester, and a boric acid salt, and boron hydrides, but are not limited thereto. In particular, boric acid or a boric acid salt is preferably used. Specifically, examples of the boric acids include orthoboric acid, metaboric acid, and tetraboric acid, examples of the boric acid ester include triethyl borate and trimethyl borate, and examples of the boric acid salt include alkali metal salts and alkaline earth metal salts of the various boric acids, and borax. Of those compounds, boric acid is preferred.

When the boron compound is added, the content of the boron compound in the EVOH paste (II) to be obtained after the main washing step is typically 10 to 10,000 ppm, preferably 100 to 8,000 ppm, more preferably 100 to 7,000 ppm with respect to the EVOH paste in terms of boron (analyzed by ICP emission spectrometry after incineration). When the content of the boron compound is excessively small, an improving effect on thermal stability is small, and when the content is excessively large, there is a tendency that gelation is induced or moldability becomes poor. It should be noted that the concentration of the boron compound in the washing water is typically 10 to 3,000 ppm, suitably 20 to 1,000 ppm, more suitably 30 to 500 ppm.

Examples of the phosphoric acid compound include various acids such as phosphoric acid and phosphorous acid, and salts thereof. The phosphoric acid salt may be contained in any one of the forms of primary a phosphoric acid salt, a secondary phosphoric acid salt, and tertiary phosphoric acid salt. The cationic species thereof is also not particularly limited, but the salt is preferably an alkali metal salt or an alkaline earth metal salt. Of those, the phosphoric acid compound is preferably added in the form of sodium dihydrogen phosphate, potassium dihydrogen phosphate, disodium hydrogen phosphate, or dipotassium hydrogen phosphate.

When the phosphoric acid compound is added, the content of the phosphoric acid compound in the EVOH paste (II) to be obtained after the main washing step is typically 1 to 1,000 ppm in terms of a phosphoric acid radical (analyzed by ion chromatography) with respect to the EVOH paste. The addition of the compound at a content within the range can suppress the coloring of a molded product and the occurrence of a gel or a fish eye. When the content is excessively small, there is a tendency that coloring is apt to occur at the time of the melt molding. In contrast, when the content is excessively large, a gel or a fish eye may be apt to occur in the molded product. It should be noted that the concentration of the phosphoric acid compound in the washing water is typically 1 to 3,000 ppm, preferably 10 to 1,000 ppm, more preferably 20 to 500 ppm.

Next, the inner structure of the horizontal washing tank to be used in the main washing step is described in detail.

Figure 2:
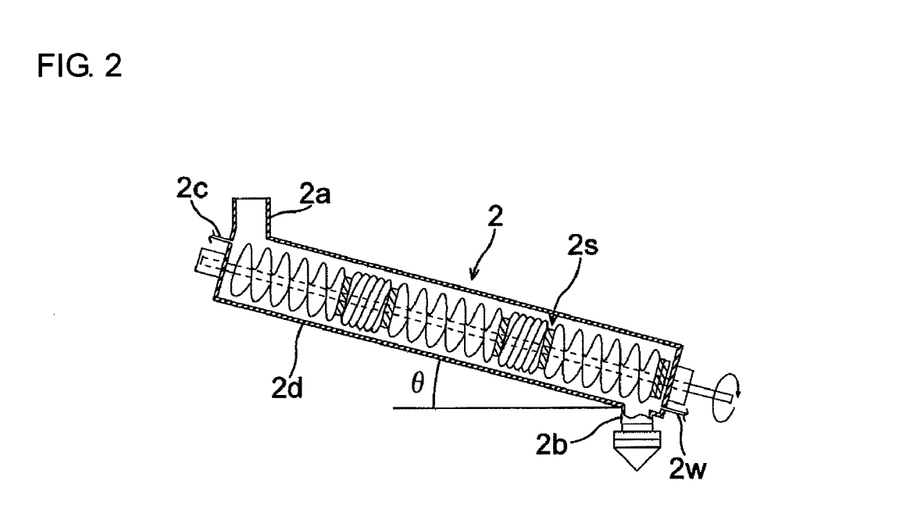
FIG. 2 is a schematic sectional view in a longitudinal direction illustrating the inner construction of a horizontal washing tank to be used in a main washing step of an embodiment of the present invention.
Figure 3:
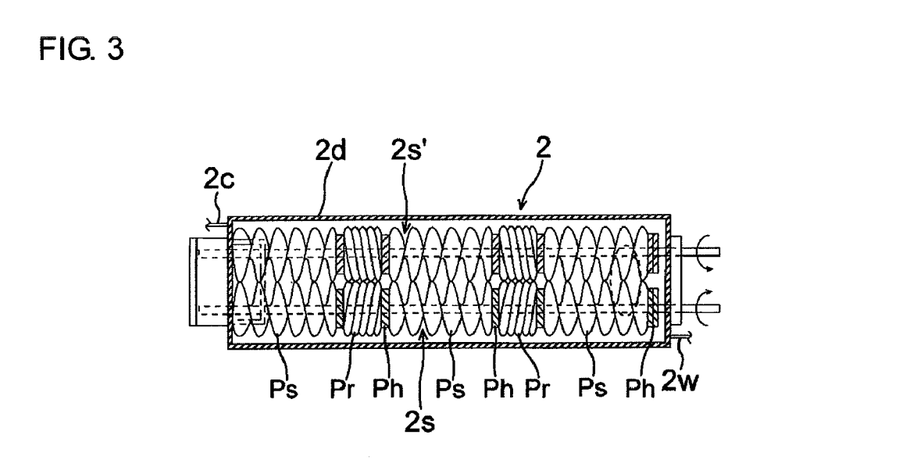
FIG. 3 is a schematic sectional view when the inner part of the horizontal washing tank to be used in the main washing step of the embodiment of the present invention is viewed down from above.

The horizontal washing tank is provided with a kneading apparatus for imparting a shear force to the paste, and the apparatus is, for example, a kneading apparatus having a screw, a gear, a paddle, or the like. The shear force applied by such kneading apparatus to the paste is preferably in a direction perpendicular to the lengthwise direction of the horizontal washing tank. In other words, the shear force is preferably in a direction perpendicular to the flow direction of the paste. In addition, a facility to be attached is desirably a facility provided with temperature-regulating means such as a jacket, a coil, or a screw shaft with a built-in heater. FIG. 2 is a schematic sectional view (cut model) in a longitudinal direction illustrating the inner construction of the horizontal washing tank 2 to be used in the main washing step of this embodiment, and FIG. 3 is a schematic sectional view when the inner part of the horizontal washing tank 2 is viewed from above.

The horizontal washing tank in this embodiment is mainly constructed of a tank main body of a substantially square shape (box shape) capable of storing water in itself and a screw for kneading the paste. Although the number of the screws may be one or two or more, washing efficiency tends to be excellent when the number is two or more. Most of all, the number is preferably two to five in terms of operation efficiency, and is particularly preferably two. Specifically, as illustrated in FIG. 3, the horizontal washing tank 2 in this embodiment is mainly constructed of a tank main body 2d of a substantially square shape (box shape) capable of storing water in itself, and a pair (two) of screws 2s, 2s' for kneading the paste, and these screws are each of such a form as to apply the shear force in the direction perpendicular to the lengthwise direction of the horizontal washing tank.

In the present invention, the tank main body is placed horizontally or so as to tilt. When the tank main body is placed so as to tilt, the tank main body is placed so as to tilt by θ° with respect to the horizontal. The θ° is typically more than 0 to 45°, preferably 10 to 30°. Here, when the horizontal washing tank is tilted by θ° with respect to the horizontal (when θ°>0), it is preferred that the loading port for the EVOH paste (I) be placed on an upper side and the paste derivation port for deriving the paste-like water-containing EVOH composition (EVOH paste (II)) after the completion of the washing be placed on a lower side. Simultaneously, it is preferred that the washing water injection port be placed on the lower side and the washing water discharge port be placed on the upper side. When the placement positions are regulated as described above, the following tendency is observed. The counter flow contact between the paste and the washing water can be efficiently performed and the paste having a heavy specific gravity can be derived from the lower portion of the tank, and hence the recovery efficiency of the paste after the washing is improved.

Specifically, as illustrated in FIG. 2, the horizontal washing tank 2 in this embodiment tilts by 15° with respect to the horizontal. An upper surface on one end side (left in the figure) to serve as the upper side when the tank is tilted is provided with the paste introduction port 2a to serve as a loading port for the paste containing the mixture of the EVOH, and the water and the alcohol derived from the preliminary washing step, and a lower surface on the other end side (right in the figure) to serve as the lower side is provided with the paste derivation port 2b for deriving the paste-like water-containing EVOH composition (EVOH paste (II)) after the completion of the kneading and washing in the tank main body 2d. It should be noted that in FIG. 2, reference symbol 2w represents the washing water introduction port and reference symbol 2c represents the water discharge port for the washing water. With such construction, the washing water can be brought into contact with the paste in a counter flow manner. In addition, such a water-tight structure that only the paste can be taken out without the leakage of the water (washing water) is formed in the paste derivation port 2b.

The screws can each be constructed of a shaft and a plurality of blades mounted on the shaft. Specifically, for example, the screws are placed in the tank main body 2d along its lengthwise direction, and are provided parallel to each other so that the tips of their respective blades are brought into light contact with each other, thereby forming a kneading apparatus of the so-called "two-shaft kneader" type. It should be noted that the two-shaft kneader-type kneading apparatus differs from a general kneader (kneading machine) in the following point. The kneading apparatus is a "large clearance-type kneader" provided with a large gap (space: also referred to as "clearance") between each of the screws and the tank main body, the screws rotate in the water (washing water) filled into the gap and knead the paste in a liquid phase by applying the shear force to the paste to perform surface renewal, and hence the alcohol, impurities, and the like in the paste are efficiently dissolved in the washing water.

It should be noted that the "clearance" represents the nearest distance between the tip portion of a blade of each screw and the inner wall of the horizontal washing tank. The clearance is typically 1 to 20 mm, preferably 5 to 15 mm, more preferably 5 to 10 mm. When the clearance is excessively wide, the surface renewal efficiency of the paste tends to reduce, and when the clearance is excessively narrow, the transfer efficiency of the paste tends to reduce. It should be noted that the general kneader can be used as the horizontal washing tank as well, though opportunities to be brought into contact with the washing water reduce to some extent.

In addition, in the present invention, the placement of the screws is preferably adjusted so that the paste containing the EVOH, the water, and the alcohol can be subjected to such surface renewal that its surface is repeatedly displaced by its inner part. For example, the rotation direction of each of the screws is adjusted so that screw teeth are oriented toward meshing directions.

In this embodiment, for example, when the number of the screws is two, the kneader-type kneading apparatus is designed so that the two screws 2s, 2s' rotate in directions different from each other as illustrated in FIG. 3 (both rotate in inward meshing directions in this example). In addition, a site (such as a bearing) for supporting the shaft of each of the screws is of a water-tight, waterproof structure because the inside of the tank main body 2d is filled with the water. In addition, each screw is connected to a rotational power source such as a motor (not shown).

It should be noted that, for example, a flat paddle (Pf) intended for kneading, a helical paddle (Ph) that incorporates feeding into the kneading, a reverse helical paddle (Pr) for feeding a material backward, and the like are available as the blades (paddles) mounted on the shaft, and are used in combination with a screw portion (Ps) for feeding the material to a downstream side. Although a combination of the paddles in this embodiment is such that the screw portion (Ps), the helical paddle (Ph), and the reverse helical paddle (Pr) are combined as illustrated in FIG. 3, the combination can be appropriately changed in accordance with, for example, the viscosity of the paste.

In addition, the following condition is requested of the kneading apparatus that can be used in this embodiment. The apparatus has a shredding function simultaneously with stirring and kneading functions for applying shear to the paste. Therefore, when the paste to be supplied is continuously subjected to a washing treatment, a kneading apparatus of, for example, a dual arm kneader type, a kokneader type, or a votator type as well as of the two-shaft kneader type may be used. Also available is a kneading apparatus having a horizontal single axis or double axis such as: a mixing machine of, for example, a ribbon shape, a screw shape, a paddle shape, a muller shape, or a radial rod shape; a mixer such as a pin mixer, a cutter mixer, a rod mixer, or an internal mixer; or a mill such as a ball-rod mill or a pug mill. Although each of a continuous treatment mode and a batch treatment mode can be adopted in the present invention, the continuous treatment mode is preferred from the viewpoint of production efficiency.

Specifically, for example, the paste introduced into the horizontal washing tank 2 is smoothly transported from the paste introduction port 2a to serve as an upstream side toward the paste derivation port 2b to serve as a downstream side in the washing water by a feeding action exerted by the screw portions of the respective screws (2s, 2s') and/or the tilt of the bottom surface of the horizontal washing tank 2. In addition, the paste is kneaded by a shear action that occurs when the paste passes a gap between the respective paddles opposed to each other and a gap between the screws so that the outer surface of the paste enters the inside thereof and the inner part of the paste exits to the outside, and hence the surface of the paste is sequentially renewed, in other words, kneading in a liquid phase is performed. Thus, sufficient contact with the washing water is performed.

Therefore, some or all of the alcohol, and impurities such as the residue of the catalyst to be used at the time of the saponification and a by-product are removed from the paste containing the ethylene/vinyl alcohol copolymer and the alcohol in this embodiment together with the washing water with high efficiency. In addition, at least one kind of additive selected from a carboxylic acid, a carboxylate, a boron compound, and a phosphoric acid compound is added as a thermal stabilizer to the washing water. Accordingly, the additive can be uniformly dispersed and mixed in the paste in association with the kneading of the paste.

The paste-like water-containing EVOH composition (EVOH paste (II)) obtained in the main washing step of the present invention has an EVOH resin content of typically 30 to 80 wt %, preferably 40 to 70 wt %, and has a water content of typically 30 to 400 parts by weight, preferably 40 to 240 parts by weight, more preferably 50 to 150 parts by weight with respect to 100 parts by weight of the EVOH. Although the composition may contain the alcohol that could not be completely removed, its content is typically less than 10 parts by weight, suitably less than 5 parts by weight, more suitably less than 3 parts by weight with respect to 100 parts by weight of the EVOH. In ordinary cases, the endpoint is preferably defined as described below. The content of the alcohol in the water-containing EVOH composition in the horizontal washing tank 2 is monitored, and the time point at which the content reaches a desired alcohol concentration is defined as the endpoint.

The viscosity of the EVOH paste is a value for the viscosity of 500 g of the paste measured by a falling-ball viscosity measurement method (Stokes' law) with a steel ball having a diameter of 3 mm in a glass autoclave, and is typically $10^1$ to $10^6$ mPa·s, preferably $10^3$ to $10^6$ mPa·s, particularly preferably $5 \times 10^4$ to $10^6$ mPa·s. As the alcohol content becomes extremely small, the viscosity of the paste tends to increase.

Further, the remaining saponification catalyst which the resultant EVOH paste (II) has is washed in the main washing step, and hence the content of the remaining saponification catalyst is typically 0 to 3,000 ppm, preferably 0 to 2,000 ppm, more preferably 0 to 1,000 ppm with respect to the EVOH. It should be noted that in the case of an alkali catalyst, the content is determined as the content of an acetate.

In the washing steps of this embodiment, the alcohol is not completely removed in the preliminary washing step with the tower-type washing vessel so that the resultant remains in a paste state maintaining its fluidity. Thus, treatment efficiency is prevented from reducing. Next, in the main washing step with the horizontal washing tank, the paste is brought into contact with the washing water while being forcedly stirred and kneaded. Thus, the replacement of the alcohol and the water progresses efficiently even when the paste has a high concentration and a high viscosity. As a result, the EVOH that has been in a swollen state because the EVOH contains the alcohol contracts as the alcohol content reduces, and the water, the residue of the catalyst to be used at the time of the saponification, a by-product, and the like are discharged from the paste together with the alcohol. Thus, a water-containing EVOH composition of high purity and high quality (water content: 30 to 400 parts by weight, preferably 50 to 150 parts by weight with respect to 100 parts by weight of the EVOH) is obtained.

That is, it is difficult to obtain such water-containing EVOH composition (EVOH paste (II)) having a low alcohol content as to be obtained in the present invention with the tower-type washing vessel 1 of the preliminary washing step alone because the viscosity of the EVOH paste becomes so high in the latter half of the treatment in the washing vessel 1 that its fluidity reduces to lower the efficiency of the replacement of the alcohol and the water, and the paste cannot be derived from the washing vessel 1.

In addition, when one tries to replace most of the alcohol in the alcohol solution of the EVOH with water with the horizontal washing tank 2 of the main washing step alone, the following tendency is observed. As the original viscosity of the solution to be introduced into the horizontal washing tank 2 is low and the introduced washing water cannot remain in the EVOH paste for a long time period, the replacement efficiency is low, the step takes a long time period, and a large amount of water is needed. Therefore, in the present invention, the step of replacing the alcohol in the solution containing the EVOH and the alcohol with water is preferably performed in a plurality of stages by providing the preliminary washing step and the like.

Next, the step of drying and pelletizing the paste-like water-containing EVOH composition (EVOH paste (II)) having a small alcohol content obtained in the main washing step (into a product pellet) is described.

The pelletizing step is performed by, for example, (A) a method involving molding the paste-like water-containing EVOH composition (EVOH paste (II)) having a small alcohol content into a pellet shape while maintaining its water content and then reducing the water content or (B) a method involving reducing the water content of the paste-like water-containing EVOH composition (EVOH paste (II)) having a small alcohol content and then molding the resultant into a pellet shape.

Examples of the method (A) include: a method involving extruding the paste-like water-containing EVOH composition (EVOH paste (II)) having a small alcohol content through a hole and cutting the composition while allowing the composition to have fluidity to obtain a circular pellet (such as hot cut or underwater cut); and a method involving extruding the water-containing resin into a strand shape in a coolant bath having a temperature lower than that of the resin to solidify the strand and cutting the strand to obtain a columnar pellet. In addition, the resultant pellet is dried by any one of the various known drying methods.

The method (B) involves, for example, reducing the water content in the paste-like water-containing EVOH composition (EVOH paste (II)) having a small alcohol content with a centrifugal separator, an extruder, or the like in advance so that the water content is typically 1 to 50 parts by weight, preferably 1 to 40 parts by weight, more preferably 1 to 30 parts by weight with respect to 100 parts by weight of the EVOH, and pelletizing the resultant with an extruder or the like. The pelletization is performed by, for example, a method involving extruding the EVOH resin into a strand shape with an extruder and cutting the strand to obtain a columnar pellet or a method involving cutting the resin in a molten state immediately after its extrusion from an extruder to obtain a circular pellet (hot cut). In consideration of the thermal efficiency of the drying step and a thermal history of the resin, the method (B) is particularly preferably adopted because the operations of reducing the water content of the water-containing EVOH composition and of pelletizing the composition can be performed in series when an extruder is used.

Examples of the extruder to be used in the pelletizing step include a uniaxial extruder and a biaxial extruder. The extruder to be used includes a bore (mmφ) of typically 40 to 180, suitably 60 to 140, more suitably 70 to 110. In addition, the ratio L/D of the extruder to be used is typically 10 to 80, preferably 15 to 70, more preferably 15 to 60. When the ratio L/D is excessively small, there is a tendency that a dehydration effect becomes insufficient or ejection becomes instable. In contrast, when the ratio is excessively large, excessive shear heating tends to be caused. Of those, such a biaxial extruder that the rotation directions of screws are the same direction is more preferred because sufficient kneading is obtained by virtue of moderate shear.

In this case, the temperature of the resin in the extruder is typically 80 to 250° C., preferably 90 to 240° C., more preferably 100 to 230° C. When the temperature is excessively high, the resin is apt to deteriorate and color. When the temperature is excessively low, the efficiency with which the water content is reduced tends to reduce. Although a method of adjusting the resin temperature is not particularly limited, a method involving appropriately setting the temperature of a cylinder in the extruder is typically employed.

The screw speed of the extruder to be adopted, which varies depending on the size of its shaft, falls within the range of typically 10 to 1,000 rpm, suitably 30 to 800 rpm, more suitably 50 to 400 rpm. When the speed is excessively small, the ejection tends to become instable. In addition, when the speed is excessively large, shear heating may be responsible for the deterioration of the resin.

Specifically, for example, as illustrated in FIG. 1, the system to be used in the step is formed of, for example, a first extruder 3, a second extruder 4, and a strand cutter (pelletizer: not shown), the paste-like water-containing EVOH composition (EVOH paste (II)) obtained in the main washing step is sequentially loaded into the first extruder 3 and the second extruder 4, and is melt-kneaded so that the water content in the water-containing EVOH composition is gradually reduced, and at the same time, the strand- or ribbon-like EVOH composition ejected from the second extruder 4 is cooled, and then the EVOH composition is cut into a predetermined size with the strand cutter or the like so that an EVOH pellet having a low alcohol content and a low water content is obtained.

A general uniaxial extruder, biaxial extruder, or the like can be used as each of the first extruder 3 and the second extruder 4 to be used in the pelletizing step. Of those, the biaxial extruder is more preferred because sufficient kneading is obtained by virtue of moderate shear.

In addition, the resin temperature in each of the extruders is typically set to 80 to 250° C., and is adjusted so that the water content of the EVOH composition after its ejection from the first extruder 3 is typically 30 to 35 parts by weight with respect to 100 parts by weight of the EVOH and so that the water content of the EVOH composition after its ejection from the second extruder 4 is typically less than 10 parts by weight, preferably 0 to 8 parts by weight with respect to 100 parts by weight of the EVOH. It should be noted that when one wishes to reduce the water content of the EVOH composition to the extent possible in the pelletizing step, the resin temperature in each of the extruders is set to fall within the range of typically 120 to 250° C., preferably 150 to 230° C. In contrast, when one wishes to perform the step while maintaining the water content for suppressing the thermal deterioration of the EVOH composition to the extent possible, the step is performed while the resin temperature in each of the extruders is set to fall within the range of typically 80 to 105° C., suitably 85 to 100° C., more suitably 90 to 100° C.

Further, water or steam is preferably discharged from at least one site of each of the extruders because the EVOH composition in a water-containing state (EVOH paste (II)) is melt-kneaded in the extrusion with the extruders. Although water-discharging means for the purpose is not particularly limited, a method involving discharging the water or the steam from a dehydration hole, vent port, dehydration slit, or the like provided for the cylinder (barrel) of each extruder can be adopted. Of those, a dehydration slit is preferably used because the slit can discharge both the water and the steam, and suppresses the adhesion and leakage of the resin. It should be noted that a plurality of such water-discharging means may be used, and in this case, the plurality of means may be of the same kind, or different kinds of means may be used in combination.

In addition, although a method of pelletizing the EVOH composition ejected from the second extruder 4 is not particularly limited, a method involving extruding the EVOH composition from the die (mouthpiece) of the extruder into a strand shape, cooling the strand, and cutting the cooled strand into a proper length is suitably employed. Employed as a method of cooling the ejected strand is, for example, a method involving bringing the ejected resin into contact with a liquid whose temperature is held at a temperature lower than that of the resin or a method involving blowing cold air to the resin.

In addition, the shape of the cut pellet is typically a cylindrical shape, and a die bore of 2 to 6 mmcp and a strand cut length of about 1 to 6 mm are suitably used for its sizes from the viewpoint of convenience when the pellet is used as a molding material later. It should be noted that a method involving cutting the EVOH composition ejected from the extruder in the air or water while the composition is still in a molten state is also suitably employed.

It should be noted that in the pelletizing step, two or more kinds of EVOH compositions different from each other in polymerization degree, ethylene content, saponification degree, or the like obtained through a process different from that of the water-containing EVOH composition (EVOH paste (II)) can be blended and melt-molded. In addition, the melt-kneading can be performed by adding a proper amount of, for example, any one of various other plasticizers, lubricants, stabilizers, surfactants, coloring agents, UV absorbers, antistatic agents, desiccants, crosslinking agents, metal salts, fillers, and reinforcing agents such as various fibers.

Next, a pellet drying step (not shown) of reducing the water content of the EVOH pellet obtained in the pelletizing step as required is described.

The EVOH pellet obtained from the pelletizing step can be provided as a product without being treated as long as its water is sufficiently removed in the extruder so that its water content is less than 0.3 part by weight with respect to 100 parts by weight of the EVOH. In addition, when the water removal is insufficient, redundant water is removed by subjecting the pellet to the pellet drying step.

A known drying method can be adopted as a method of drying the EVOH pellet. Specific examples thereof include a ventilation drying method and a fluidized drying method. A multistage drying mode based on different drying methods can also be adopted. A method involving performing drying by the fluidized drying method on a first stage and performing drying by the ventilation drying method on a second stage is particularly suitable because the color tone of each of the pellet and a molded article using the pellet becomes satisfactory. Circulating an inert gas such as a nitrogen gas ($N_2$ gas) upon drying is also suitable because the color tone of the molded article becomes satisfactory.

Specifically, for example, the volatile matter content of the EVOH pellet obtained in the pelletizing step is reduced to less than 0.3 part by weight with respect to 100 parts by weight of the EVOH as a final product level by supplying and circulating an inert gas such as a nitrogen gas ($N_2$ gas) in a drying vessel as required. In addition, such volatile matter content (including the alcohol) is obtained by calculating a weight change during drying of the pellet at 150° C. for 5 hours.

According to the process for producing an ethylene/vinyl alcohol copolymer in the present invention, a residence time needed for the drying step is short. Accordingly, the thermal deterioration of an EVOH (pellet) to be obtained does not occur, and the quality of each of the EVOH and a molded article using the EVOH is improved.

Next, the present invention is described in more detail by way of examples. However, the present invention is not limited to the following examples unless any modification to the examples deviates from the gist of the present invention. It should be noted that the terms "part(s)" and "%" in the examples mean "part(s) by weight" and "wt %," respectively unless otherwise stated.

EXAMPLE 1

<Methanol Solution of EVOH>

330 Parts by weight of vinyl acetate, 60 parts by weight of methanol, and 500 ppm of acetyl peroxide (with respect to vinyl acetate) were loaded into a polymerization vessel having a cooling coil, and then the system was replaced with a nitrogen gas once. After that, the system was subsequently replaced with ethylene, and then ethylene was pressed into the system until an ethylene pressure reached 3.6 MPa. After that, the temperature of the mixture was increased to 68° C. while the mixture was stirred, and then the mixture was subjected to polymerization for 6 hours until the polymerization degree of vinyl acetate reached 50 wt %. After that, the polymerization reaction was stopped. Thus, a methanol solution of an ethylene/vinyl acetate copolymer having an ethylene content of 29 mol % (resin content concentration: 48 wt %) was obtained.

<Saponifying Step>

The methanol solution of the ethylene/vinyl acetate copolymer (resin content concentration: 48 wt %) after the removal of remaining vinyl acetate in the reaction solution was supplied from the upper portion of a plate column at a speed of 30 parts by weight/hour, and at the same time, a methanol solution of 6 millimole equivalents of sodium hydroxide with respect to the number of moles of acetic acid groups in the copolymer was supplied from the upper portion of the column at 0.54 part by weight/hour. Meanwhile, methanol was supplied from the lower portion of the column at 60 parts by weight/hour. The temperature in the column was 120 to 140° C. and the pressure in the column was 0.36 MPaG. After a lapse of 0.5 hour from the initiation of the loading, a methanol solution of the EVOH was obtained. The EVOH has an ethylene content of 29 mol % and a saponification degree of 99.5 mol %, and the solution contains sodium acetate corresponding to the sodium component of sodium hydroxide as a saponification catalyst. It should be noted that the unit "MPaG" is a unit in a gauge value, and represents a difference between an absolute pressure and an atmospheric pressure.

<Preliminary Washing Step>

Next, the methanol solution of the EVOH was supplied to a tower-type washing vessel (plate column having 10 plates). A methanol solution of the EVOH having a resin content concentration of 51 wt % was continuously supplied to a second tray plate from the tower apex of the tower-type washing vessel at 80 parts by weight/hour. On the other hand, steam at 130° C. was continuously supplied from the lowest tray plate at 60 parts by weight/hour, and then the methanol solution of the EVOH and the steam were brought into contact with each other in the plate column by a counter flow. The temperature in the tower-type washing vessel was 120° C. and the pressure in the vessel was 0.2 MPaG.

Then, a paste containing 75 parts by weight of methanol and 75 parts by weight of water with respect to 100 parts by weight of the EVOH (water/methanol (weight ratio)=50/50) was obtained from a paste derivation port at the bottom portion of the tower-type washing vessel. The EVOH resin content with respect to the entirety of such paste was 40 wt %. It should be noted that the resultant paste contained 4,700 ppm of sodium acetate.

The water content of the EVOH paste was simultaneously adjusted by adding a water/alcohol solvent solution containing boric acid and acetic acid to the paste.

<Main Washing Step>

An EVOH paste having such components and property as described below was supplied to the horizontal washing tank 2 described in the embodiment and washed under the following conditions. (EVOH paste)

The EVOH paste contains 141 parts by weight of methanol and 247 parts by weight of water with respect to 100 parts by weight of the EVOH (water/methanol (weight ratio)=64/36), has a resin content of 21 wt %, and contains 2,100 ppm of acetic acid, 7,900 ppm of sodium acetate, and 4,300 ppm of boric acid with respect to its EVOH resin content. In addition, its viscosity is a value for the viscosity of 500 g of the paste measured at 80° C. and normal pressure by a falling-ball viscosity measurement method (Stokes' law) with a steel ball having a diameter of 3 mm in a glass autoclave, and is 7,000 mPa·s.

(A) Washing (Kneading-Stirring) Conditions

| | |
|---|---|
| Screw speed: | 60 rpm |
| Clearance between screw and tank inner wall: | 8 mm |
| Temperature in tank (in terms of water temperature before discharge port): | 79° C. |

(B) EVOH Paste Conditions

| | |
|---|---|
| Introduction amount: | 17 parts by weight/hour |
| Introduced paste temperature: | 80° C. |
| Paste residence time: | 3 hours |
| Derivation amount: | 6.4 parts by weight/hour |

(C) Washing Water Conditions

Washing water composition (with respect to water)

| | |
|---|---|
| Acetic acid | 160 ppm |
| Sodium acetate | 200 ppm |
| Boric acid | 110 ppm |
| Sodium dihydrogen phosphate | 80 ppm |
| Calcium phosphate | 150 ppm |
| Introduction amount: | 16 parts by weight/hour |
| Temperature: | 85° C. |

It should be noted that the washing was performed while a bath ratio (ratio of the weight of the washing water to the weight of the EVOH paste) was adjusted to 0.94.

Then, an EVOH paste that had turned into an opaque, high-viscosity paste was obtained from the paste derivation port 2b of the horizontal washing tank 2. It should be noted that the resultant EVOH paste contains 83 parts by weight of water and 2 parts by weight of methanol with respect to 100 parts by weight of the EVOH, has an EVOH resin content of 49 wt %, and contains 1,360 ppm of acetic acid, 530 ppm of sodium acetate, 730 ppm of boric acid, 80 ppm of sodium dihydrogen phosphate, and 150 ppm of calcium phosphate with respect to the EVOH resin content. In addition, its viscosity is a value for the viscosity of 500 g of the paste measured at 120° C. by a falling-ball viscosity measurement method (Stokes' law) with a steel ball having a diameter of 3 mm in a glass autoclave, and is 80,000 mPa·s.

That is, the dealcoholization amount of the paste in the horizontal washing tank per 100 parts by weight of the EVOH is 99 wt % of the amount of the alcohol which the paste before the introduction into the horizontal washing tank contains. Such EVOH paste was molded into a sheet shape at normal temperature, and was then further cut into a strip shape and dried. Thus, an EVOH pellet was obtained. Such pellet has an MFR (at 210° C. and under a load of 2,160 g) of 3.0 g/10 minutes.

EXAMPLE 2

<Methanol Solution of EVOH>

330 Parts by weight of vinyl acetate, 55 parts by weight of methanol, and 300 ppm of acetyl peroxide (with respect to vinyl acetate) were loaded into a polymerization vessel having a cooling coil, and then the system was replaced with a nitrogen gas once. After that, the system was subsequently replaced with ethylene, and then ethylene was pressed into the system until an ethylene pressure reached 3.3 MPa. After that, the temperature of the mixture was increased to 68° C. while the mixture was stirred, and then the mixture was subjected to polymerization for 6 hours until the polymerization degree of vinyl acetate reached 60 wt %. After that, the polymerization reaction was stopped. Thus, a methanol solution of an ethylene/vinyl acetate copolymer having an ethylene content of 29 mol % (resin content concentration: 56 wt %) was obtained.

<Saponifying Step>

The methanol solution of the ethylene/vinyl acetate copolymer (resin content concentration: 56 wt %) after the removal of remaining vinyl acetate in the reaction solution was supplied from the upper portion of a plate column at a speed of 31 parts by weight/hour, and at the same time, a methanol solution of 6 millimole equivalents of sodium hydroxide with respect to the number of moles of acetic acid groups in the copolymer was supplied from the upper portion of the column at 0.94 part by weight/hour. Meanwhile, methanol was supplied from the lower portion of the column at 52 parts by weight/hour. The temperature in the column was 120 to 140° C. and the pressure in the column was 0.36 MPaG. After a lapse of 0.5 hour from the initiation of the loading, a methanol solution of the EVOH was obtained. The EVOH has an ethylene content of 29 mol % and a saponification degree of 99.5 mol %, and the solution contains sodium acetate corresponding to the sodium component of sodium hydroxide as a saponification catalyst. It should be noted that the unit "MPaG" is a unit in a gauge value, and represents a difference between an absolute pressure and an atmospheric pressure.

<Preliminary Washing Step>

Next, the methanol solution of the EVOH was supplied to a tower-type washing vessel (plate column having 10 plates). The methanol solution of the EVOH having a resin content concentration of 56 wt % was continuously supplied to a second tray plate from the tower apex of the tower-type washing vessel at 52 parts by weight/hour. On the other hand, steam at 130° C. was continuously supplied from the lowest tray plate at 14 parts by weight/hour, and then the methanol solution of the EVOH and the steam were brought into contact with each other in the plate column by a counter flow. The temperature in the tower-type washing vessel was 120° C. and the pressure in the vessel was 0.26 MPaG.

Then, a paste containing 100 parts by weight of methanol and 50 parts by weight of water with respect to 100 parts by weight of the EVOH (water/methanol (weight ratio)=33/66) was obtained from a paste derivation port at the bottom portion of the tower-type washing vessel. The EVOH resin content with respect to the entirety of such paste was 40 wt %. It should be noted that the resultant paste contained 5,000 ppm of sodium acetate.

The water content of the EVOH paste was simultaneously adjusted by adding an aqueous solution containing boric acid and acetic acid to the paste.

<Main Washing Step>

An EVOH paste having such components and property as described below was supplied to the horizontal washing tank 2 described in the embodiment and washed under the following conditions. (EVOH paste)

The EVOH paste contains 100 parts by weight of methanol and 75 parts by weight of water with respect to 100 parts by weight of the EVOH (water/methanol (weight ratio)=43/57), has a resin content of 36 wt %, and contains 2,100 ppm of acetic acid, 7,900 ppm of sodium acetate, and 4,300 ppm of boric acid with respect to its EVOH resin content. In addition, its viscosity is a value for the viscosity of 500 g of the paste measured at 80° C. and normal pressure by a falling-ball viscosity measurement method (Stokes' law) with a steel ball having a diameter of 3 mm in a glass autoclave, and is 8,000 mPa·s.

(A) Washing (Kneading-Stirring) Conditions

| | |
|---|---|
| Screw speed: | 60 rpm |
| Clearance between screw and tank inner wall: | 8 mm |
| Temperature in tank (in terms of water temperature before discharge port): | 79° C. |

(B) EVOH Paste Conditions

| | |
|---|---|
| Introduction amount: | 17 parts by weight/hour |
| Introduced paste temperature: | 80° C. |
| Paste residence time: | 3 hours |
| Derivation amount: | 6.4 parts by weight/hour |

(C) Washing Water Conditions
Washing water composition (with respect to water)

| | |
|---|---|
| Acetic acid | 150 ppm |
| Sodium acetate | 140 ppm |
| Boric acid | 30 ppm |
| Sodium dihydrogen phosphate | 130 ppm |
| Calcium phosphate | 150 ppm |
| Introduction amount: | 34 parts by weight/hour |
| Temperature: | 85° C. |

It should be noted that the washing was performed while a bath ratio (ratio of the weight of the washing water to the weight of the EVOH paste) was adjusted to 2.

Then, an EVOH paste that had turned into an opaque, high-viscosity paste was obtained from the paste derivation port 2b of the horizontal washing tank 2. It should be noted that the resultant EVOH paste contains 83 parts by weight of water and 2 parts by weight of methanol with respect to 100 parts by weight of the EVOH, has an EVOH resin content of 54 wt %, and contains 1,360 ppm of acetic acid, 530 ppm of sodium acetate, 550 ppm of boric acid, 80 ppm of sodium dihydrogen phosphate, and 150 ppm of calcium phosphate with respect to the EVOH resin content. In addition, its viscosity is a value for the viscosity of 500 g of the paste measured at 120° C. by a falling-ball viscosity measurement method (Stokes' law) with a steel ball having a diameter of 3 mm in a glass autoclave, and is 88,000 mPa·s.

That is, the dealcoholization amount of the paste in the horizontal washing tank per 100 parts by weight of the EVOH is 99 wt % of the amount of the alcohol which the paste before the introduction into the horizontal washing tank contains.

Such EVOH paste was molded into a sheet shape at normal temperature, and was then further cut into a strip shape and dried. Thus, an EVOH pellet was obtained. Such pellet has an MFR (at 210° C. and under a load of 2,160 g) of 3.4 g/10 minutes.

EXAMPLE 3

<Methanol Solution of EVOH>

400 Parts by weight of vinyl acetate, 80 parts by weight of methanol, and 390 ppm of acetyl peroxide (with respect to vinyl acetate) were loaded into a polymerization vessel having a cooling coil, and then the system was replaced with a nitrogen gas once. After that, the system was subsequently replaced with ethylene, and then ethylene was pressed into the system until an ethylene pressure reached 3.6 MPa. After that, the temperature of the mixture was increased to 67° C. while the mixture was stirred, and then the mixture was subjected to polymerization for 6 hours until the polymerization degree of vinyl acetate reached 60 wt %. After that, the polymerization reaction was stopped. Thus, a methanol solution of an ethylene/vinyl acetate copolymer having an ethylene content of 32 mol % (resin content concentration: 53 wt %) was obtained.

<Saponifying Step>

The methanol solution of the ethylene/vinyl acetate copolymer (resin content concentration: 53 wt %) after the removal of remaining vinyl acetate in the reaction solution was supplied from the upper portion of a plate column at a speed of 32 parts by weight/hour, and at the same time, a methanol solution of 8 millimole equivalents of sodium hydroxide with respect to the number of moles of acetic acid groups in the copolymer was supplied from the upper portion of the column at 1 part by weight/hour. Meanwhile, methanol was supplied from the lower portion of the column at 50 parts by weight/hour. The temperature in the column was 100 to 120° C. and the pressure in the column was 0.3 MPaG. After a lapse of 0.5 hour from the initiation of the loading, a methanol solution of the EVOH was obtained. The EVOH has an ethylene content of 32 mol % and a saponification degree of 99.6 mol %, and the solution contains sodium acetate corresponding to the sodium component of sodium hydroxide as a saponification catalyst. It should be noted that the unit "MPaG" is a unit in a gauge value, and represents a difference between an absolute pressure and an atmospheric pressure.

<Preliminary Washing Step>

Next, the methanol solution of the EVOH was supplied to a tower-type washing vessel (plate column having 10 plates). A methanol solution of the EVOH having a resin content concentration of 53 wt % was continuously supplied to a second tray plate from the tower apex of the tower-type washing vessel at 80 parts by weight/hour. On the other hand, steam at 130° C. was continuously supplied from the lowest tray plate at 6 parts by weight/hour, and then the methanol solution of the EVOH and the steam were brought into contact with each other in the plate column by a counter flow. The temperature in the tower-type washing vessel was 111° C. and the pressure in the vessel was 0.2 MPaG.

Then, a paste containing 117 parts by weight of methanol and 61 parts by weight of water with respect to 100 parts by weight of the EVOH (water/methanol (weight ratio)=34/66) was obtained from a paste derivation port at the bottom portion of the tower-type washing vessel. The EVOH resin content with respect to the entirety of such paste was 36 wt %. It should be noted that the resultant paste contained 4,000 ppm of sodium acetate.

The water content of the EVOH paste was simultaneously adjusted by adding an aqueous solution containing boric acid and acetic acid to the paste.

<Main Washing Step>

An EVOH paste having such components and property as described below was supplied to the horizontal washing tank 2 described in the embodiment and washed under the following conditions. (EVOH paste)

The EVOH paste contains 117 parts by weight of methanol and 96 parts by weight of water with respect to 100 parts by weight of the EVOH (water/methanol (weight ratio)=45/55), has a resin content of 32 wt %, and contains 1,600 ppm of acetic acid, 1,700 ppm of sodium acetate, and 180 ppm of boric acid with respect to its EVOH resin content. In addition, its viscosity is a value for the viscosity of 500 g of the paste measured at 80° C. and normal pressure by a falling-ball viscosity measurement method (Stokes' law) with a steel ball having a diameter of 3 mm in a glass autoclave, and is 7,000 mPa·s.

(A) Washing (Kneading-Stirring) Conditions

| | |
|---|---|
| Screw speed: | 60 rpm |
| Clearance between screw and tank inner wall: | 8 mm |
| Temperature in tank (in terms of water temperature before discharge port): | 100° C. |

(B) EVOH Paste Conditions

| | |
|---|---|
| Introduction amount: | 11 parts by weight/hour |
| Introduced paste temperature: | 80° C. |
| Paste residence time: | 1.5 hours |
| Derivation amount: | 6.5 parts by weight/hour |

(C) Washing Water Conditions
Washing water composition (with respect to water)

| | |
|---|---|
| Acetic acid | 350 ppm |
| Sodium acetate | 370 ppm |
| Boric acid | 40 ppm |
| Calcium phosphate | 15 ppm |
| Introduction amount: | 23 parts by weight/hour |
| Temperature: | 100° C. |

Temperature: 100° C.

It should be noted that the washing was performed while a bath ratio (ratio of the weight of the washing water to the weight of the EVOH paste) was adjusted to 2.

Then, an EVOH paste that had turned into an opaque, high-viscosity paste was obtained from the paste derivation port 2b of the horizontal washing tank 2. It should be noted that the resultant EVOH paste contains 80 parts by weight of water and 1 part by weight of methanol with respect to 100 parts by weight of the EVOH, has an EVOH resin content of 55 wt %, and contains 2,500 ppm of acetic acid, 630 ppm of sodium acetate, 660 ppm of boric acid, and 10 ppm of calcium phosphate with respect to the EVOH resin content. In addition, its viscosity is a value for the viscosity of 500 g of the paste measured at 120° C. by a falling-ball viscosity measurement method (Stokes' law) with a steel ball having a diameter of 3 mm in a glass autoclave, and is 85,000 mPa·s.

That is, the dealcoholization amount of the paste in the horizontal washing tank per 100 parts by weight of the EVOH is 99 wt % of the amount of the alcohol which the paste before the introduction into the horizontal washing tank contains. Such EVOH paste was molded into a sheet shape at normal temperature, and was then further cut into a strip shape and dried. Thus, an EVOH pellet was obtained. Such pellet has an MFR (at 210° C. and under a load of 2,160 g) of 4.8 g/10 minutes.

The foregoing results show that some or all of remaining methanol, and an impurity that threatens to cause a problem such as coloring in the EVOH and a molded article using the EVOH (such as a remaining catalyst or a by-product in saponification) are removed together with the washing water of the main washing step with high efficiency.

Although the examples have shown specific modes in the present invention, the examples are merely exemplification and should not be construed as being limitative. Further, all modifications belonging to the equivalent of the scope of claims are within the scope of the present invention.

Industrial Applicability

According to the process for producing an ethylene/vinyl alcohol copolymer of the present invention, the amounts of impurities in an EVOH product to be obtained are reduced, and hence the quality of each of the EVOH and a molded article using the EVOH is improved.

In addition, the pellet of the resultant EVOH is molded into a molded article such as a film, a sheet, a cup, or a bottle by melt molding such as extrusion molding or injection molding to widely find use in packaging applications for foods, drugs, industrial chemicals, agricultural chemicals, and the like.

Reference Signs List

| | |
|---|---|
| 1 | washing vessel |
| 1a | paste introduction port |
| 1b | paste derivation port |
| 1c | exhaust port |
| 1d | tray plate |
| 1s | steam introduction port |
| 2 | horizontal washing tank |
| 2a | paste introduction port |
| 2b | paste derivation port |
| 2c | water discharge port |
| 2d | tank main body |
| 2s, 2s' | screw |
| 2w | washing water introduction port |
| 3 | extruder |
| 4 | extruder |
| Ps | screw portion |
| Ph | helical paddle |
| Pr | reverse helical paddle |

The invention claimed is:

1. A process for producing an ethylene/vinyl alcohol copolymer, comprising a main washing step comprising: introducing a paste containing an ethylene/vinyl alcohol copolymer and an alcohol into a horizontal washing tank; applying a shear force to the paste to knead the paste while bringing the paste into contact with washing water in the horizontal washing tank so that a surface of the paste is repeatedly displaced by an inner part thereof; and discharging at least some of the alcohol to an outside of the tank together with the washing water to obtain a water-containing ethylene/vinyl alcohol copolymer composition having a small alcohol content.

2. A process for producing an ethylene/vinyl alcohol copolymer according to claim 1, wherein the horizontal washing tank is placed to tilt from above toward below along a flow direction of the paste in the horizontal washing tank.

3. A process for producing an ethylene/vinyl alcohol copolymer according to claim 1, wherein the horizontal washing tank has a bath ratio of 0.5 to 10 in terms of a weight ratio of the introduced washing water to the introduced paste.

4. A process for producing an ethylene/vinyl alcohol copolymer according to claim 1, wherein the horizontal washing tank includes a screw for applying the shear force in a direction perpendicular to a lengthwise direction of the horizontal washing tank and the screw has a clearance of 1 to 20 mm.

5. A process for producing an ethylene/vinyl alcohol copolymer according to claim 1, wherein a dealcoholization amount of the paste containing the ethylene/vinyl alcohol copolymer and the alcohol in the horizontal washing tank is 80 to 100 wt % of an amount of the alcohol which the paste before the introduction into the horizontal washing tank contains.

6. A process for producing an ethylene/vinyl alcohol copolymer according to claim 1, wherein a residence time of the paste containing the ethylene/vinyl alcohol copolymer and the alcohol in the horizontal washing tank is 0.5 to 10 hours.

7. A process for producing an ethylene/vinyl alcohol copolymer according to claim 1, wherein the washing water of the main washing step contains at least one kind of additive selected from the group consisting of a carboxylic acid, a carboxylate, a boron compound, and a phosphoric acid compound.

8. A process for producing an ethylene/vinyl alcohol copolymer according to claim 1, wherein the water-containing ethylene/vinyl alcohol copolymer composition obtained in the main washing step has a water content of 30 to 400 parts by weight with respect to 100 parts by weight of the ethylene/vinyl alcohol copolymer.

9. A process for producing an ethylene/vinyl alcohol copolymer according to claim 1, wherein the water-containing ethylene/vinyl alcohol copolymer composition obtained in the main washing step has an alcohol content of less than 10 parts by weight with respect to 100 parts by weight of the ethylene/vinyl alcohol copolymer.

10. A process for producing an ethylene/vinyl alcohol copolymer according to claim 1, wherein a content of the alcohol in the paste containing the ethylene/vinyl alcohol copolymer and the alcohol before the introduction into the horizontal washing tank is 3 to 200 parts by weight with respect to 100 parts by weight of the ethylene/vinyl alcohol copolymer.

11. A process for producing an ethylene/vinyl alcohol copolymer according to claim 1, wherein the paste to be subjected to the main washing step comprises a paste containing the ethylene/vinyl alcohol copolymer, the alcohol, and water, and a water/alcohol ratio thereof is (1/99) to (70/30) in terms of a weight ratio.

12. A process for producing an ethylene/vinyl alcohol copolymer according to claim 1, further comprising, before performance of the main washing step, a preliminary washing step including: introducing a solution containing the ethylene/vinyl alcohol copolymer and the alcohol into a washing vessel; bringing the solution into contact with one of water and steam in the washing vessel; and discharging some of the alcohol to an outside of the vessel together with the one of the water and the steam to obtain a paste containing the ethylene/vinyl alcohol copolymer, the alcohol, and the water.

13. A process for producing an ethylene/vinyl alcohol copolymer according to claim 1, further comprising the step of obtaining a pellet of the ethylene/vinyl alcohol copolymer including: supplying the water-containing ethylene/vinyl alcohol copolymer composition obtained in the main washing step to an extruder; melt-kneading the composition, ejecting the composition after the kneading; and cutting the composition.

14. A process for producing an ethylene/vinyl alcohol copolymer according to claim 13, wherein the pellet of the ethylene/vinyl alcohol copolymer obtained from the step of obtaining the pellet has a water content of less than 10 parts by weight with respect to 100 parts by weight of the ethylene/vinyl alcohol copolymer.

15. A process for producing an ethylene/vinyl alcohol copolymer according to claim 13, wherein the pellet of the ethylene/vinyl alcohol copolymer obtained from the step of obtaining the pellet has a volatile matter content of less than 0.3 part by weight with respect to 100 parts by weight of the ethylene/vinyl alcohol copolymer during drying of the pellet at 150° C. for 5 hours.

16. A process for producing an ethylene/vinyl alcohol copolymer according to claim 14, wherein the pellet of the ethylene/vinyl alcohol copolymer obtained from the step of obtaining the pellet has a volatile matter content of less than 0.3 part by weight with respect to 100 parts by weight of the ethylene/vinyl alcohol copolymer during drying of the pellet at 150° C. for 5 hours.

* * * * *